United States Patent
Mannan et al.

(10) Patent No.: US 10,977,381 B2
(45) Date of Patent: Apr. 13, 2021

(54) PROTECTION SYSTEM AND METHOD AGAINST UNAUTHORIZED DATA ALTERATION

(71) Applicants: Mohammad Mannan, Montreal (CA); Lianying Zhao, Montreal (CA)

(72) Inventors: Mohammad Mannan, Montreal (CA); Lianying Zhao, Montreal (CA)

( * ) Notice: Subject to any disclaimer, the term of this patent is extended or adjusted under 35 U.S.C. 154(b) by 0 days.

(21) Appl. No.: 16/454,050

(22) Filed: Jun. 27, 2019

(65) Prior Publication Data

US 2020/0012803 A1    Jan. 9, 2020

Related U.S. Application Data

(60) Provisional application No. 62/691,215, filed on Jun. 28, 2018.

(51) Int. Cl.
  *G06F 21/62* (2013.01)
  *G06F 21/31* (2013.01)

(52) U.S. Cl.
  CPC .......... *G06F 21/6218* (2013.01); *G06F 21/31* (2013.01)

(58) Field of Classification Search
  None
  See application file for complete search history.

(56) References Cited

U.S. PATENT DOCUMENTS 7,712,143 B2 * 5/2010 Comlekoglu ........... G06F 21/53
                                            726/26
10,587,406 B1 * 3/2020 Levin .................... H04L 9/0643
2008/0165957 A1 * 7/2008 Kandasamy ........ G06F 21/6218
                                            380/44
2010/0146582 A1 * 6/2010 Jaber .................. G06F 21/6218
                                            726/1
2013/0173931 A1 * 7/2013 Tzafrir .................... G06F 21/79
                                            713/193

(Continued)

*Primary Examiner* — Kaveh Abrishamkar

(57) ABSTRACT

A system for protecting user-editable files against unauthorized data alteration or against compromised operating systems or compromised applications. It comprises of untrusted operating environments and a trusted operating environment. One or more untrusted operating environments makes available user-editable files for creation and editing, and are stored in a non-protected partition of storage drive. The trusted operating environment provides an authentication key to access protected partition of storage drive, and stores copies of user-editable files in a protected partition of storage drive. Each new stored copy of a user-editable file in the protected partition corresponds to a new or an updated version of the user-editable file. A set of files and folders can be initially selected in an uncompromised untrusted operating environment. A trusted updater module running inside the trusted operating environment can perform copying to protected partition. Scheduled tasks can also copy user-editable files. Untrusted operating environment can also be suspended prior to triggering the trusted environment. The trusted operating environment can be implemented using a Trusted Execution Environment (TEE) or a similar trusted environment enabled CPU. The authentication key can be sealed into a Trusted Platform Module (TPM), or a Secure Element (SE). Protected partition can be on a security enhanced device.

27 Claims, 3 Drawing Sheets

(56) References Cited

U.S. PATENT DOCUMENTS

| | | | |
|---|---|---|---|
| 2014/0130188 A1* | 5/2014 | Baryudin | G06F 21/44 |
| | | | 726/29 |
| 2014/0365443 A1* | 12/2014 | Goel | G06F 11/3664 |
| | | | 707/679 |
| 2016/0246737 A1* | 8/2016 | Vichodes | G06F 12/1408 |
| 2016/0253519 A1* | 9/2016 | Broumas | G06F 21/6245 |
| | | | 713/189 |
| 2017/0103225 A1* | 4/2017 | Pearson | G06F 21/575 |
| 2018/0189103 A1* | 7/2018 | Teshler | H04L 67/42 |
| 2018/0219841 A1* | 8/2018 | Nadler | H04L 9/0637 |

* cited by examiner

PROTECTION SYSTEM AND METHOD AGAINST UNAUTHORIZED DATA ALTERATION

TECHNICAL FIELD

The present disclosure generally relates to a system and method for protecting against unauthorized data alteration, and more particularly, providing protection by storing copies of files/folders in a write-protected partition that is only accessible while in a trusted operating environment.

BACKGROUND

Unauthorized data alteration has been a long-standing threat since the emergence of malicious software (malware), and more specifically, ransomware. System and application software can be reinstalled and hardware can be purchased again, but user data is priceless in many cases. Especially in recent years, ransomware has become a serious problem as it is monetizable upon alteration (encryption) of user data. Its notoriousness is marked by recent high-impact incidents incurring increasing financial loss and emotional distress. Beyond enterprise-grade rigorous backup strategies, state-of-the-art defenses are mostly based on known signature or behavior analysis, and more importantly, require an uncompromised OS kernel.

Detection of malicious software is one technique for protecting against unauthorized data alteration. Common anti-malware approaches relying on binary signatures are largely ineffective against ransomware. Some solutions rely on system/user behavior signatures, exemplified by file system activity monitoring.

To complement detection-based solutions (or assuming they may be bypassed), recovery-based mechanisms may also be deployed, several countermeasures against generic rootkit attacks have also been proposed, focusing on intrusion-resiliency and forensics, and preventing persistent infection.

Another obvious countermeasure against ransomware is to make offline backup of important data regularly (on media disconnected from the computer). Although simple in theory, effective deployment/use of backup tools could be non-trivial, e.g., determining frequency of backups, checking integrity of backups regularly. More problematically, the disconnected media must be connected (online) during backup, at which point, ransomware can encrypt/delete the files. For cloud-based backup systems, such as Dropbox (centralized) and Syncthing.net (peer-to-peer), a common issue is the size of a bloated TCB (includes a full OS with multiple network-facing servers), which may lead to large-scale data loss, if compromised.

SUMMARY

According to one aspect, there is provided a computer-implemented method of protecting a set of at least one user-editable file against unauthorized data alteration. The method includes while operating in an untrusted operating environment, making available at least one user-editable file for creation and editing, the user-editable file being stored in a non-protected partition of a storage drive. The method also includes, while operating in a trusted operating environment, providing an authentication key to access a protected partition of the storage drive and storing copies of said at least one user-editable file in the protected partition of the storage drive, each new stored copy of a given user-editable file in the protected partition corresponding to a new or an updated version of the given user-editable file.

According to another aspect, there is provided a system for protecting files against rootkit malware. The system includes a storage drive having a protected partition and a non-protected partition and a set of operating components for selectively operating in one of an untrusted operating environment and a trusted operating environment. The components are configured to, while operating in the untrusted operating environment, make available at least one user-editable file for creation and editing, the user-editable file being stored in a non-protected partition of a storage drive. The components are also configured to, while operating in the trusted operating environment, providing an authentication key to access the protected partition of the storage drive and storing copies of said at least one user-editable file in the protected partition of the storage drive, each new stored copy of a given user-editable file in the protected partition corresponding to a new or an updated version of the given user-editable file.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
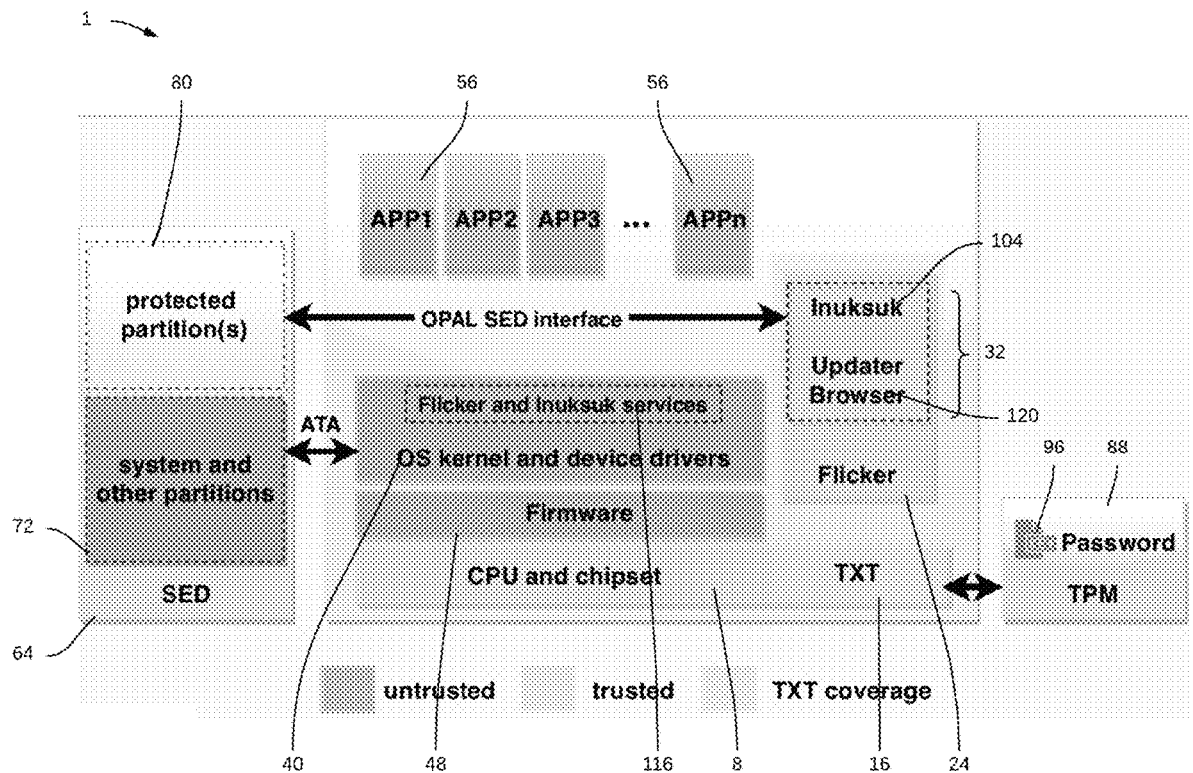
FIG. 1 illustrates a schematic diagram of the operational modules of a data protection system according to an example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

It will be understood that data stored on storage device and the computer programs are typically susceptible to be compromised by malicious software. The malicious software can operate independently to access the storage device and harm stored data. Alternatively, the malicious software can alter operation of an already installed software such that this altered software performs unauthorized alteration of data stored on the software device. "Unauthorized alteration of data" herein refers to such scenarios for comprising a storage device and/or computer programs.

"Trusted operating environment" herein refers to an operating state of a computer system in which a trusted computing base is present. More particularly, a set of hardware, firmware and software components critical for ensuring uncompromised access to the protected partition of a storage drive are attested as being present. The trusted operating environment can be provided by the trusted execution environment (TEE) of a central processing unit of the computer system. Furthermore, in the trusted operating environment, components outside the trusted computing base may be suspended.

"Untrusted operating environment" herein refers to an operating state of the computer system other than the trusted operating environment. It is expected that the untrusted operating environment is susceptible to being compromised by malicious software, and this, despite the presence of modules running in the untrusted operating environment for protecting against malicious software, such as detection-based mechanisms. Various example embodiments described herein contemplate that malicious software operating the untrusted operating environment cannot alter operation of the computer system while operating in the trusted operating environment.

One or more systems and methods described herein may be implemented in a computer system wherein the operational modules are implemented in a combination of hardware components and computer programs executing on the computer system. The computer system can be a single system, such as a mainframe computer, workstation, person computer, laptop, portable device, or the like. The computer system can also be a network of computers and/or network connected devices.

Referring now to FIG. 1, therein illustrated is a schematic diagram of the operational modules of a data protected system 1 according to an example embodiment. The schematic diagram illustrates a combination of hardware components and computer programs executing on the data protected system 1.

The data protected system 1 includes a central processing unit 8 that has at least one hardware-based security module 16. The hardware-based security module 16 is built into the hardware design of the central processing unit 8 (i.e. the hardware-based security module is silicon-based). More particularly, the hardware-based security module 16 is configured to enable attesting that an operating environment of the computer system has not been tampered with. Even more particularly, the hardware-based security module 16 is configured to enable dynamic root of trust measurement, which allows attesting that an operating environment is "trusted" (i.e. has not been tampered with) at runtime (i.e. without having to reboot the computer system). For example, hardware-based security module 16 can be the Trusted Execution Environment of the central processing unit 8, such as the Intel™ Trusted Execution Technology or the AMD™ Secure Virtual Machine.

The hardware-based security module 16 has installed thereon a trusted operating module 24, which is a software module, that is operable to attest the presence of a trusted operating environment by comparing the operating environment of the computer system (ex: BIOS, hardware components, OS and hypervisor) with an expected and known safe operating environment. This attesting is performed using dynamic root of trust measurement. It will be appreciated that the hardware-based security module 16 provides a trusted computing base (TCB) (i.e. the trusted operating environment) subsequent to attesting that the components necessary for that TCB has not been tampered with. The trusted operating module 24 is further operable to execute security-sensitive code modules 32 while the trusted operating environment is present. Moreover, the trusted operating module 24 executes the security-sensitive code modules 32 in isolation from the running of an operating system 40 (ex: Windows, Linux, or the like) that is installed on the data protected system 1. The security-sensitive code modules 32 are software modules that require only the operation of hardware components that form the trusted computing base. The security-sensitive code modules 32 are executed from within the trusted operating module 24, as illustrated. In one example embodiment, the trusted operating module 24 is the Flicker module (available: https://sourceforge.net/p/flickertcb/wiki/Home/). The Flicker module is an architecture that allows a Piece of Application Logic (PAL) to execute in complete isolation from other software while trusting only a tiny software base that is orders of magnitude smaller than even minimalist virtual machine monitors.

Continuing with FIG. 1, the data protected system 1 further has installed thereon the operating system 40, which may be an operating system commonly used in the industry, such as Windows, Linux or MacOS. The data protected system 1 further has firmware 48 installed thereon. The operating system 40 provides control over at least some of the hardware components of the data protected system 1 via the firmware 48 and device drivers installed within the operating system 40. The operating system 40 further enables the running of one or more application programs 56, such as programs typically used by a user of a computing system (ex: word processor, spreadsheet, internet browser, productivity tools, and creation tools, etc.). The firmware 48, operating system 40 and application programs 56 are part of an untrusted operating environment of the data protected system 1. That is, these parts of the data protected system 1 are vulnerable to tampering by malicious software that can be used to further tamper with data stored on the system 1.

As described in the background, detection of malicious software within the untrusted operating environment provides a level of security against malicious software. However, it will be understood that various data protection techniques described herein according to various example embodiments are intended to provide a level of security that goes beyond the security provided by detection of malicious running within the untrusted operating environment of the data protected system 1.

The data protected system 1 further includes a self-encrypting storage drive 64. The self-encrypting storage device 64 can be an OPAL standard-compliant self-encrypting drive or a similar drive providing programmable access control protection for its partitions. The storage drive 64 may be a hard drive or a solid state drive. The storage drive 64 includes a non-protected partition 72 and a protected partition 80. The non-protected partition 72 stores data that is accessible by components (hardware and/or software) that are part of the untrusted operating environment, such as the operating system 40, the firmware 48 and the application programs 56. Accordingly, the non-protected partition 72 of the storage drive 64 is also part of the untrusted operating environment.

The data stored in the protected partition 80 is only accessible upon the providing of an appropriate authentication key. The data protected system 1 is configured such that the authentication key can only be provided to unlock the protected partition 80 when operating in the trusted operating environment. More particularly, the authentication key can only be provided by the trusted operating module 24 when operating in the trusted operating environment. Accordingly, the interface of the self-encrypting storage drive 64 that provides access to the protected partition 80 forms part of the trusted operating environment of the data protected system 1. This interface can be implemented within the disk firmware/hardware of the self-encrypting storage drive 64.

According to one example embodiment, and as illustrated, the data protected system 1 includes a hardware-based trusted platform module (TPM) 88 that stores the authentication key 96. The authentication key 96 within the trusted platform module 88 is configured to only be accessible while operating in the trusted operating environment. Accordingly, the trusted platform module 88 also forms part of the trusted operating environment of the data protected system 1.

Components and modules that are only accessible and operable while in the trusted operating environment of the protected system 1 are highlighted in Green in FIG. 1 and components and modules that are accessible and operable while in the untrusted operating environment and that are suspended while in the trusted operating environment are highlighted in purple in FIG. 1. The hardware-based security module 16 is highlighted in pink in FIG. 1.

The security-sensitive code modules 32 includes a data updater submodule 104 that is implemented within and operated from the hardware-based security module 16. The data updater submodule 104 is also referred to herein as a "trusted updater" and is nicknamed "Inuksuk" in one example implementation, and as illustrated herein. The data updater submodule 104 is configured to be operated only from the trusted operating environment and from the trusted computing base (i.e. after the trusted operating module 24 has attested the presence of the trusted operating environment). The data updater submodule 104 is also configured to retrieve the authentication key 96, such as from the trusted platform module 88, and to provide the authentication key to the protected partition 80 to gain access thereto. According to one example embodiment, and as illustrated, data communication between the data updater submodule 104 and the protected partition 80 is carried out over an OPAL SED interface.

The data updater submodule 104 is configured to operate in a read-write mode. In this mode, the data updater submodule 104 receives one or more versions of a set of at least one user-editable file stored within the non-protected partition 72 and stores a copy of each version of each file of the set within the protected partition 80.

The at least one user-editable file can be edited by a user from the user interacting within one or more application programs 56 running within the operating system 40. It will be appreciated that multiple versions of the at least one file can be created due to edits made to the file over time. The data updater submodule 104 causes copies of these versions to be stored within the protected partition 80. The data uploader submodule 104 can cause copies of these versions to be stored intermittently. In some embodiments, one version of each file is stored within the protected partition at each intermittent instance.

Continuing with FIG. 1, the data protected system 1 includes an update monitoring submodule 116, which may be a software-implemented application program installed in the operating system 40. It will be appreciated that the update monitoring submodule 116 operates while the system is in the untrusted operating environment.

The update monitoring submodule 116 is configured to receive selection of the set of at least one user-editable file for which copies will be stored in the protected partition 80. For example, the update monitoring submodule 116 includes a file manager application that is operable to access the file system of the non-trusted partition 72. The update monitoring submodule 116 is further operable to provide a graphical user interface for displaying the file system. The graphical user interface includes interactive elements that allows a user to select the one or more files and/or folders for which copies should be stored in the protected partition 80. The selected files and/or the files stored in the selected folders form the set of at least one user-editable file to be stored in the protected partition 80.

The updating monitoring submodule 116 is further configured to make the set of at least one selected user-editable file available to the data updater submodule 104. The submodule 104 has read access to unprotected partition(s) 72, from which the submodule 104 can copy files to the protected partition 80 (where submodule 104 alone has write access), when a new file version is available.

The updating monitoring submodule 116 is further operable to trigger the data protected system 1 to enter its trusted operating environment from its untrusted operating environment. The updating monitoring submodule 116 is operable to suspend current operation of the operating system 40 and application programs 56 running thereon, store a current operating state of the operating system 40, and trigger the trusted operating module 24 to attest the presence of a trusted computing base. According to one example embodiment, a portion of the Flicker module can be implemented within the updating monitoring submodule 116, this portion causing the suspending of current operation of the operating system 40 and application programs 56 running thereon, storing a current operating state of the operating system, and triggering the trusted operating module 24 to attest the presence of a trusted operating environment. It will be appreciated that having entered the trusted operating environment, the data updater submodule 104 can be operated to store a current copy of each of the set of user-editable files to the protected partition 80.

The triggering of the data protected system 1 to enter its trusted operating environment and to store a current copy of the set of user-editable files can be made in response to a request made by a user interacting with the update monitoring submodule 116 via the operating system 40 (i.e. from the untrusted operating environment). Alternatively, the triggering can be made according to a predetermined schedule. For example, the triggering and the storing of the copies can be made periodically (ex: daily, hourly, etc . . . ). It will be appreciated that the editing/updating of a given one of the set of user-editable files/folders over time creates multiple versions (ex: new versions and/or updated versions) of that file. These versions can be stored as a batch within the protected partition. One version of that file may be stored within each instance of operating the trusted operating environment. Accordingly, the repeated storing of a copy of the user-editable files/folders over time causes the new and/or updated versions of that file to be stored within the protected partition 80.

In one example embodiment, a copy of the current version of the given file at the time of triggering the trusted operating environment is stored within the protected partition 80. In another example embodiment, multiple versions of the given file that are created between two instances of the triggering can be cached, and a copy is stored within the protected partition 80 for each cached version. It will be appreciated that over time, multiple copies of the set of the user-editable files/folders are stored within the protected partition 80, each copy corresponding to a version at a given point in time of the user-editable files/folders.

The data updater submodule 104 can also be configured to operate in a delete mode. In this mode, the data updater submodule 104 is operable to delete copies of the user-editable file stored in the protected partition. The deletion can be carried out according a set of predetermined rules. For example, the rules can define a copy age threshold, whereby copies of a given user-editable file that are older than the copy age threshold are automatically deleted. The predetermined rules are stored within the data protected system 1 such that they are only modifiable when operating in the trusted operating environment.

According to one example embodiment, the deletion can also be carried out according to user-defined requests. For example, and as illustrated, the trusted operating module 24 includes an updater browser submodule 120 that is operable to access copies of the set of user-editable files stored in the protected partition 80 and provide a graphical user interface for a user to visually review the stored copies. Since the updater browser submodule 120 is part of the trusted operating module 24, it is also operated from within the trusted operating environment. The user can select copies of user-editable files to be deleted from the graphical user interface and the data updater submodule 104 is further operated to cause the selected copies to be deleted from the protected partition 80.

Figure 2:
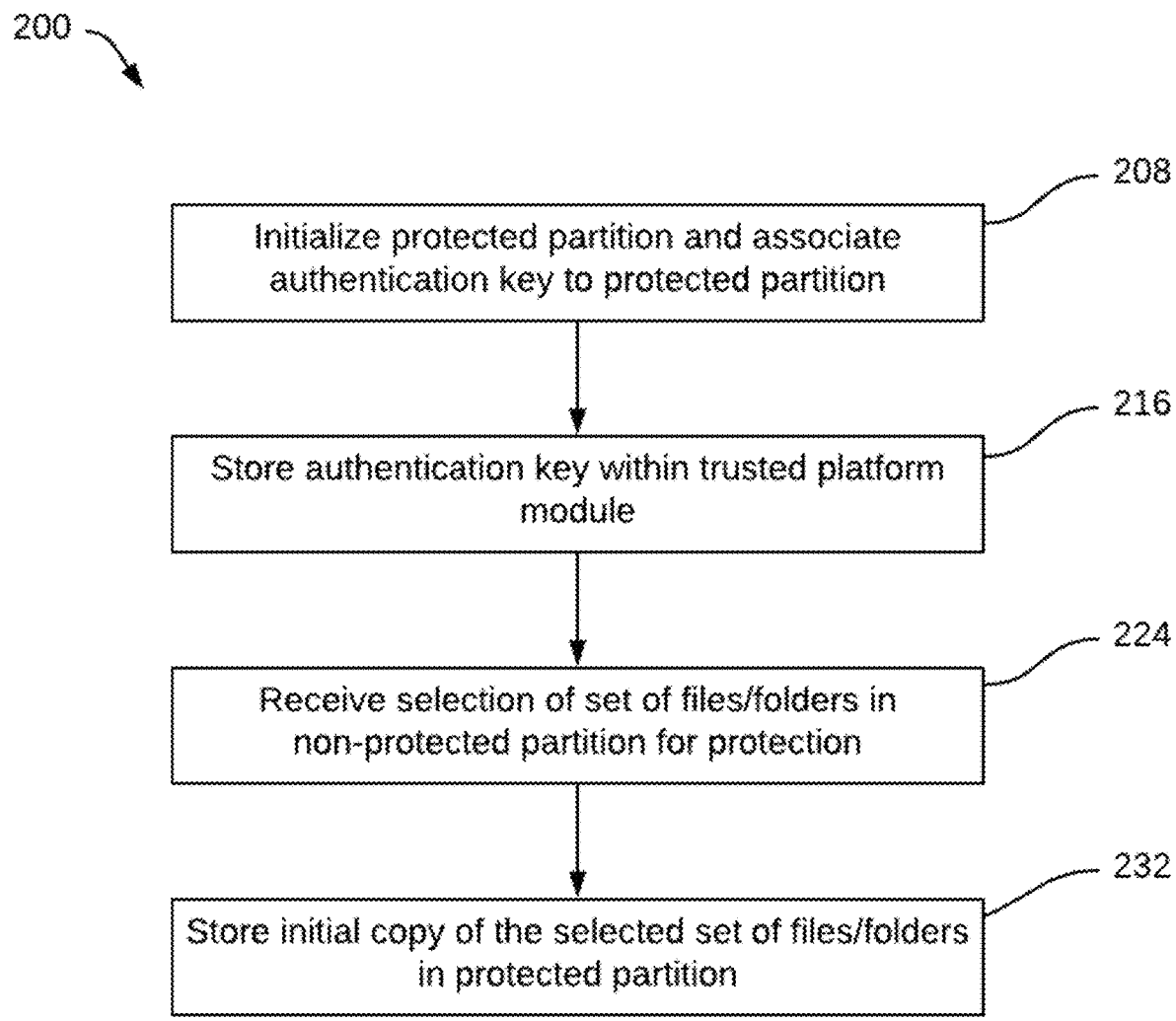
FIG. 2 illustrates a flowchart showing the operational steps of a method for initiating a data protected system according to an example embodiment.

Referring now to FIG. 2, therein illustrated is a flowchart showing the operational steps of a method 200 for initiating a data protected system 1 according to an example embodiment. The initialization is carried out while the data protected system 1 is in a non-compromised state. The non-compromised state corresponds to a state in which malicious software is not present within the computer system 1. For example, the non-compromised state can be present immediately following a fresh installation of the operating system 40 and prior to the system 1 being connected to an external network (ex: the Internet). The first step of the initialization can be the installation of various software modules for carrying out data protection, such as the trusted operating module 24 and the security-sensitive code submodules 32 within the hardware-based security module 16 and the update monitoring submodule 116 within the operating system 40.

At step 208, the protected partition 80 is created and the authentication key 96 for granting access to the protected partition 80 is generated. The creation of the protected partition 80 and the generation of the authentication key may be carried out as part of the installation of the trusted operating module 24 and the update monitoring submodule 116.

At step 216, the authentication key 96 generated at step 208 is stored in the trusted platform module 88 of the data protected system 1. The authentication key 96 is stored in a way such that it can only be accessed from the trusted operating module 24.

At step 224, the selection of the set of user-editable files/folders for which copies are to be stored is received. As described elsewhere herein, the selection can be made by a user via a graphical user interface presented by the update monitoring submodule 116. The initial set can also by default include typical folders in an OS where user-owned files are stored (e.g., "My Documents", "My Pictures", "Desktop" etc.). The selection is further made available to the data updater submodule 104.

At step 232, an initial copy of each of the selected set of user-editable files/folders are stored within the protected partition 80. This storing may be carried out by the data updater submodule 104.

The initialization is complete at step 232 and operation of the data protected system 1 can be carried out while providing a similar user experience to conventional computing systems. More particularly, following initialization, it is expected that the data protected system 1 will be operated most of the times in the untrusted operating environment during which there is a risk that malicious software can be installed within one or more components (hardware and/or software components) forming the untrusted operating environment. The malicious software can operate as a user-level process or with the highest software-level access (e.g., with admin privileges) on the untrusted operating environment.

Figure 3:
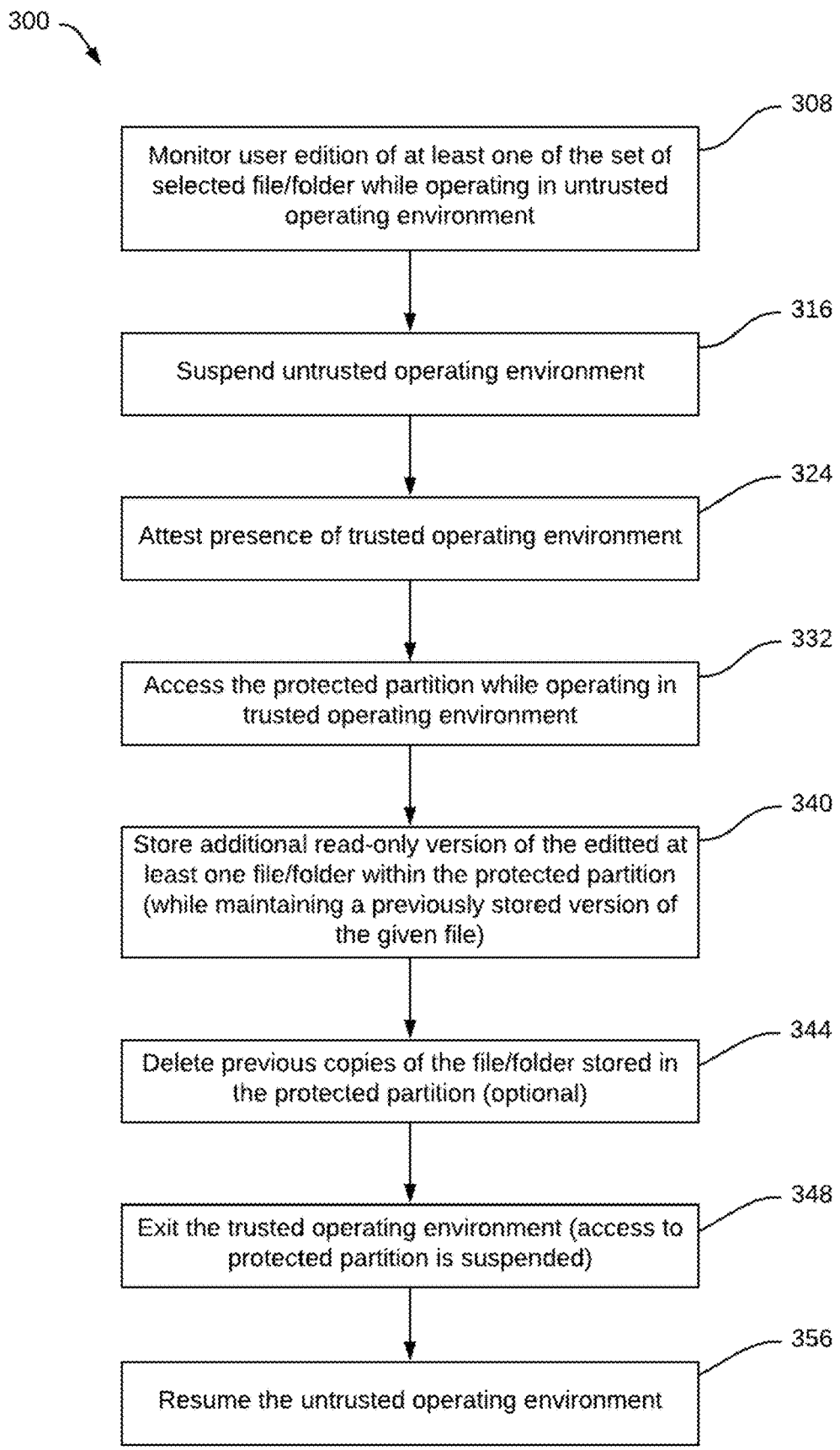
FIG. 3 illustrates a flowchart showing the operational steps of a method for storing copies of the set of user-editable file/folders according to an example embodiment.

Referring now to FIG. 3, therein illustrated is a flowchart showing the operational steps of a method 300 for storing copies of the set of user-editable files/folders while providing a safeguard against unauthorized data alteration according to an example embodiment. The method 300 is presented for a given one of the set of at least one selected user-editable files/folders stored within the non-protected partition 72 of the storage drive 64, but it will be understood that method 300 is applicable to each of the file(s) and/or folder(s) of the set.

At step 308, user editions of the given user-editable file/folder are monitored while operating in the untrusted operating environment. As described elsewhere herein, the monitoring can be carried out by the update monitoring submodule 116 installed on the operating system 40. The monitoring may include making available the latest version of the given user-editable file/folder at a given point in time immediately prior to triggering the trusted operating environment. The monitoring may also include caching intermediate versions of the given user-editable file/folder between two instances of the triggering and making available.

At step 316, as part of triggering the trusted operating environment, the current untrusted operating environment is suspended. As described elsewhere herein, this can include suspending current operation of the operating system 40 and applications programs 56 running thereon and storing a current operating state of the operating system 40 (to permit subsequently resuming the operating system 40). The suspending of the untrusted operating environment can be carried out by the update monitoring submodule 116.

At step 324, the presence of trusted operating environment is attested. As described elsewhere herein, the presence of the trusted operating environment is attested by comparing the operating environment of the computer system with an expected and known safe operating environment. The attesting can be carried out by the trusted operating module 24. A successful attestation of the trusted operating environment will make the authentication key 96 available to the modules in the trusted environment.

At step 332, the protected partition 80 is accessed while operating in the trusted operating environment. This access may be gained by retrieving the authentication key 96 from the trusted platform module 88 and providing the authentication key 96 to the protected partition 80. Retrieval and providing of the authentication key 96 is performed by operation of the data updater module 24, which is implemented by executing security-sensitive code within the hardware-based security module 16. It will be appreciated that the protected partition 80 is only accessible while operating in the trusted operating environment.

At step 340, a copy of the current version (or current cached versions) of the given user-editable file/folder is stored within the protected partition 80. It will be appreciated that new copies of the given user-editable file/folder are stored while the already stored previous copies of the given user-editable file/folder is maintained (i.e. not deleted or over written). The storing of the copy can be carried out by the data updater submodule 104.

At step 344, one or more stored copies of the user-editable file/folder may optionally be deleted from the protected partition 80. As described elsewhere herein, the deletion can only be carried in accordance with predetermined rules (ex: based on copy age threshold) or in response to a user defined request. Moreover, the predetermined rules are only modifiable when operating in the trusted operating environment. Similarly, the user-defined request can only be made from the trusted operating environment. For further clarity, it is intended that deletion of copies of user-editable file/folder cannot be caused, directly (ex: a user-defined request) or indirectly (ex: by altering predetermined deletion rules) by operation of software outside the trusted operating environment.

At step 348, the trusted operating environment is exited. More particularly, write access to the protected partition 80 of the storage drive 64 is suspended. Read access may or may not be allowed outside the trusted operating environment, depending on a user's or administrator's choice.

At step 356, the untrusted operating environment is resumed. This may include restoring the operating system 40 and application programs 56 that was previously suspended at step 316 using the stored current operating state.

In some example embodiments, a plurality of connected storage drives 64 can be provided, wherein a first subset of the storage drives form the protected partition 80 and a second subset of the storage drives form the non-protected partition 72.

The storage drives 64 may also be a plurality of drives connected over a network. Such a configuration can be useful in networked applications, such as a cloud-based solution. Within such systems, a front end device can be used by a user to edit files/folders in an untrusted operating environment. Versions of those files/folders can be stored within a non-protected partition of a storage drive of a backend storage system (ex: a network server or cloud-based server). A dedicated, separate backend system with the Inuksuk embodiment can be intermittently operated in the trusted operating environment to store those versions of the files/folders to a protected partition of the storage drive of the storage backend system. During such times of operating in the trusted operating environment, the backend storage system will still remain available to the front-end device. That is, in the network storage scenario, the front-end user devices and the backend storage system will not suffer any downtime due to Inuksuk's operations.

Various example embodiments described herein provide protection against unauthorized alteration of data by significantly limiting the way the data stored at protected partition 80 can be accessed. The data protected system 1 and method limits access to the protected partition 80 only when operating in the trusted operating environment and a trusted computing base is present. The authentication key 96 is only retrievable while in the trusted operating environment and, in some example embodiments, is stored in the trusted platform module 88. It will be appreciated that by suspending operation of the operating system 40 and application programs 56 before entering the trusted operating environment, any malicious software that is present in the operating system 40 and/or application programs 56 are also suspended. Therefore, the malicious software is not running when in the trusted operating environment.

Furthermore, the manner of altering data stored in the protected partition 80 is also significantly limited. More particularly, when in the write-only mode, the data updater submodule 104 only stores copies of user-editable files to the protected partition 80 without overwriting versions of those files already stored on the protected partition 80. It will be appreciated that any alteration of the user-editable files in the unprotected partition 72 by malicious software while in the untrusted operating environment does not affect versions of the files already stored in the protected partition 80. It will be further appreciated that this allows a user to recover a previous version of those files from the protected partition 80 (ex: before malicious software is installed on the system) despite the malicious software having altered later saved versions.

Moreover, deletion of data stored in the protected partition 80 is also limited. This deletion can be carried out only via the updater browser submodule 120 or in accordance with predefined deletion rules. Since the updater browser submodule 120 is only executed while in the trusted operating environment, it is not affected by any malicious software that would operate in the untrusted operating environment. Similarly, since the predefined deletion rules are only accessible while in the trusted operating environment, these rules can also not be altered by any malicious software that would operate in the untrusted operating environment.

Experimental Implementation

The experimental implementation described hereinafter is intended to illustrate a working example embodiment of the data protected system and method, and is not be construed as limiting various example embodiments described herein in any way.

According to one experimental implementation, we assume malware/ransomware to have the highest software privileges (e.g., compromised OS/admin rights), and propose to move from current detection/prevention based mechanisms to data immunization. Our solution, Inuksuk, relies on modern CPU's Trusted Execution Environment (TEE) and the widely-available Self-Encrypting Drive technologies for hardware-enforced write protection. We leave selected user files accessible as read-only at all times, and all updates are written as new versions securely through TEE, which is run in controlled batch to minimize storage overhead. Deletion of files is allowed from a mini file browser inside TEE. We implement Inuksuk on Windows 7 and Linux (Ubuntu); our core design is OS and application agnostic, and incurs no performance penalty during normal execution. When committing file writes in the OS-less trusted environment, our prototype achieves around 32 MB/s read and 42 MB/s write. Inuksuk represents a new starting point in the fight against rootkit-grade data tampering attacks Leveraging widely-available hardware security features in modern CPUs and hard drives, we shift the focus from detection/prevention/recovery to data immunization against rootkit ransomware. If user files could remain unmodifiable by ransomware even after the system is compromised, no reactive defense would be necessary—enabling data immunization. Separating read/write accesses of a self-encrypting drive (SED) is an intuitive option, as files in a read-only partition cannot be encrypted.

However, when write access is enabled, rootkit ransomware can make malicious changes to the protected files. Therefore, to allow controlled write-access, a trusted execution environment is also used.

We design Inuksuk, combining security features from SEDs and TEEs to protect existing user files from being deleted or encrypted by malware. Inuksuk functions as a secure data vault: user-selected files are copied to a write-protected SED partition, and the secret to allow write-access is cryptographically sealed to the machine state (i.e., the genuine intact Inuksuk and the correct hardware platform), and hence, allowing file writes to the data vault only from the trusted environment. Meanwhile access to the read/writable original copy is not affected, and will be synced at the next commit.

We must consider three common scenarios: adding new files, updating and deleting existing files. We treat file updates as new files (i.e., new versions of an existing file). Thus for new files and file updates, we commit the changes in the protected partition using our updater program in TEE, without mandating user consent.

We limit the number of versions by committing changes in batch, e.g., once every 8-12 hours. Deletion is enabled only in the trusted environment (deleting files outside the environment will fail due to the hardware write-protection), through a mini file browser (manual deletion) or by policy (e.g., automatically delete versions older than a year). Users must be careful when manually deleting (older versions of) a file, to make sure that the kept ones are not encrypted by ransomware, and set the auto-deletion duration with care. Long-running attacks (e.g., stealthy on-the-fly decryption for the user to hide encryption until ransom is demanded) have limited impact as long as file versions are retained for enough long, e.g., the adversary must delay his ransom for a year. Note that, most existing ransomware asks for ransom within minutes after infection.

Our assumption is that deletions are done only occasionally and preferably in batch (disk space is relatively cheap). In contrast, file additions (updates included) are more common, but handled without user intervention. No user-level secret is needed for controlling the write-protection. All original files stay as is and the protected copies can be available (optionally) as read-only in the regular OS.

We choose to instantiate the TEE using Trusted Platform Module (TPM) chips, and Intel TXT CPUs (see Section 3.3 for reasons, and Appendix A for background). Due to the exclusive nature (which is also a great security benefit) of the TXT environment, during file operations on the protected partition, the system is unavailable for regular use; as a mitigation, Inuksuk is triggered during idle periods (akin to Windows updates). Also note that over the past few years a series of SMM (System Management Mode) attacks have been identified, some even affecting Intel TXT. All these attacks assume a standard bootloader, hypervisor, or OS being loaded in TXT, where SMI (SMM Interrupts) must be enabled. In our case, we merely load a tiny custom binary with SMI disabled all the time, and TXT being exclusive ensures in hardware that no other code can run in parallel to stealthily trigger SMIs, and thus Inuksuk is apparently immune to these attacks. While Inuksuk can provide strong security guarantees, its implementation faces several technical challenges. For example, the TXT environment lacks run-time support and we must directly communicate with the SED device (for security) and parse the file system therein (which also involves performance considerations). Note that the use of Intel SGX is infeasible for Inuksuk, as SGX allows only ring-3 instructions, i.e., cannot access the disk without the underlying OS. Also, the user OS is unaware of the TXT sessions, so the devices (i.e., keyboard/display for secure user interface) are left in an unexpected state.

(1) We design and implement Inuksuk against root-privileged data tampering, in a radical shift in threat model from all existing academic/industry solutions. We target immunization of existing data, instead of detection/prevention of malware/ransomware.

(2) Inuksuk's design is tied to established and standardized hardware enforced security mechanisms of SED disks and TEE-enabled CPUs (in our case Intel TXT with the TPM chip). Integrating Intel TXT, TPM, and SED/OPAL together in a seamless way with a regular OS (Windows/Linux) is non-trivial, but offers a significant leap in the ransomware arms-race. Our solutions, which will be open-sourced, to several engineering/performance problems within TXT (e.g., handling CPU caching, DMA, disk/file access, keyboard/display) can also be useful for other TXT applications.

(3) We implement Inuksuk on Windows 7 and Linux (Ubuntu). The core design is OS-agnostic, which is important as ransomware today affects all major OSes. Our prototype achieves decent disk access performance within the OS-less TXT environment (around 32 MB/s read and 42 MB/s write), when committing files to the protected partition, e.g., once every 8-12 hours. The regular disk access to original files from the user OS remains unaffected, i.e., all applications perform as before.

(4) Beyond ransomware protection, Inuksuk can be used as a generic secure storage with fine-grained access control, enabling read/write operations and data encryption (with Inuksuk-stored keys), if desired. Inuksuk is locally accessible without any network dependency, and operates with a small TCB. To provide users with a centralized option, we also briefly discuss a generalized Inuksuk design (in Section 3.5), which shifts the complex of TXT/TPM/SED setup to a central location, and protects cloud/enterprise storage against ransomware attacks.

Threat Model and Assumptions (1) We assume that ransomware can acquire the highest software privileges on a system (e.g., root access or even ring-0 on x86), through any traditional mechanisms (often used by rootkits), including: known but unpatched vulnerabilities, zero-day vulnerabilities, and social-engineering. Root-level access allows ransomware to control devices (e.g., keyboard, network interface), GUI, installation/removal of device drivers.

(2) Before deployment of Inuksuk, the user system is not infected by any malware. We primarily protect preexisting data at the time of ransomware infection, and provide best-effort protection thereafter for later added/updated files until the ransomware is detected (or a ransom is demanded).

(3) We do not detect/stop the execution of ransomware, or identify its actions. Instead, we protect integrity of user data on a protected partition and ensure data accessibility. If the OS is completely corrupted or inoperable, the user can install a new OS copy or boot from another media (e.g., USB) to access her data.

(4) We deal with the most common ransomware variants (i.e., cryptoviral extortion), and exclude those that simply lock access to system resources without using encryption (non-encrypting ransomware) or deletion, and those that threaten to publish information stolen from the user (doxware or leakware).

(5) We assume all hardware (e.g., the CPU, TPM and the secure drive) and architecture-shipped (e.g., the Intel authorized code module) primitives are properly implemented by the manufactures, and the user is motivated to choose a system with no known flaws.

(6) Attacks requiring physical access are excluded (e.g., no evil maid attacks). We only consider a computer system potentially infected by malware/ransomware from the network or a removable drive. The system is attended by a user who is motivated to protect her data.

(7) We assume that after infection, ransomware will act immediately; i.e., it will find target user files, encrypt them, and then demand a ransom without much delay (e.g., few minutes/hours, vs. months). If the attacker waits, he risks of losing control, e.g., through an OS/anti-malware update, although users may not always promptly apply patches (vendors may also delay a fix). However, with every patched computer, the attacker loses money, and thus cannot remain hidden for long. To accumulate file updates, the attacker may wait for some time (i.e., long enough to collect sufficient content that the user may care), before asking for the ransom.

8) We target user-attended personal computers. Since on PC platforms, ransomware is more of a threat to Windows users, we thus consider supporting Windows to be more preferable albeit challenging (we also have a Linux prototype).

Design Goals a) Trusted write-protection: Ransomware must not be able to modify or delete protected files. We place the user files in a write protected mode (read-only) all the time in the user OS. Write operations to the protected files are only allowed inside a trusted environment. The trusted environment treats all changes as new versions (retaining historical versions) and interacts with the user for infrequent (batch) deletions.

b) Hardware enforcement. Rootkit ransomware should not be able to bypass the write-protection, enforced by the disk, where the protected partition resides, instead of any software on the host. Thus without the appropriate authentication key, the partition cannot be unlocked, even if the OS is compromised (ransomware gains all software permissions). The authentication key (a high-entropy random value, e.g., 256-bit long) is protected by, and bound to, the trusted environment (inaccessible from outside).

c) Minimal application interference. Applications (including the user OS) should operate as is. As the original files are untouched and accessed the same way by applications, normal application I/O is not hindered (even for direct I/O as in disk utilities). File copies on the protected partition are available as read-only, which should not concern regular applications.

d) Minimal user involvement. User experience should not be significantly affected. A normal user experience is preserved in Inuksuk with the separation of the original and protected copies. To reduce system unavailability, the update/commit process should be scheduled during idle hours, and all updates to a protected file are cached to be committed as a new version periodically (e.g., every 8-12 hours). The user is involved only when files must be deleted (including, removal of old versions of updated files), and manually triggering Inuksuk (for immediate commitment of cached files, when the important files are just edited/added).

Non-goals. Inuksuk is designed to act more like a data vault than a traditional backup system; e.g., we commit user data a few times a day in batches, instead of syncing updates instantly. OS/application binaries should not reside on the protected partitions. We do not target data loss due to system failure or accidental deletion.

We provide robust data integrity against advanced attacks at the expense of losing some data due to ransomware attacks (e.g., user updates to a file during the commit period). Also, data confidentiality is currently a non-goal (to facilitate unhindered operations of common applications); i.e., the ransomware can read all protected user data, and read/modify the OS/unprotected partitions. However, confidentiality and controlled read access can be easily supported; e.g., encrypting data under Inuksuk-protected keys, and enabling password-based access control for read operations on selected files.

Trusted File Versioning

We treat all write operations outside the trusted environment as adding new files (automatically approved, similar to S4), which poses no threat to existing files, and leaving only file deletion with user intervention. Any committed update to an existing file creates a new version, instead of overwriting the current version (the latest one being under the original file name) so that historical changes committed are all retained on the protected partition. We do not set a limit for the number of versions but leave it to the user to clean up in the mini file browser we developed (see Section 5.4 for details), or to configure an auto-deletion policy (e.g., after 1-2 years). Our simple versioning may not impose a significant burden on the storage space, considering: a) We commit changes to the protected partition through scheduled invocation of Inuksuk; users can explicitly trigger the updater to commit important changes immediately, which we believe would be very infrequent. So the number of versions that will be stored for a continuously updated file would still be limited, e.g., 1-4 times a day. Auto-save in applications or file access-time change do not trigger an update (it is only on the original copy). b) Nowadays, disk storage is less costly and user computers are usually over-provisioned. To improve storage utilization, specifically for large files, more aggressive versioning may be adopted (e.g., S4).

User consent is needed when files are to be deleted. We allow file deletion in the mini file browser within the trusted environment.

Users can also set a policy for automatic deletion of old versions (e.g., after 1-2 years). Direct deletion outside the trusted environment will be ignored (Ransomware sometimes deletes the original file and outputs the encrypted content to a new file, instead of doing in-place encryption); deletion of the original copy on the unprotected partition will not be synchronized to the protected partition. Regular deletion from the user is also consolidated in the same manner as deleting old versions. Both requires the user to select which file(s) to delete. We also hide old versions from the user OS to help usability. When a new version is committed, we rename the previous copy by appending its timestamp with the file name, and keep the new version with the original name.

Automatic stale version deletion. To relieve users from deleting unnecessary old versions of the same file, Inuksuk can be configured to automatically delete such versions after a certain time. The retention duration should be long enough to hurt ransomware's business model. For example, if an attacker needs to wait more than a year to monetize his ransomware, it might become much less attractive than now. Defenders are likely to generate reliable detection mechanisms (e.g., signatures) within the wait period, and even be able to identify the attackers. Calculation of the time duration must be done appropriately, as there is no trusted time source available within TXT. As rootkits can change system time, file creation/update time as available from the user OS file system cannot be trusted. A simple solution could be to use digitally signed time value from an NTP service, where the signature verification is done within TXT. The signed value can be obtained through the user OS, and must be sent for each file commit session. The trusted updater must store the last accepted signed value along with NTP verification keys, and check the new timestamp to detect replay (the time value should always be increasing).

File content verification. Before proceeding to manual file deletion, the user must verify the content integrity of the kept version (for versioning), or the correctness of the file selection (for regular deletion). Note that manual deletion may only be necessary if protected storage becomes almost full. Checking meta-data in the mini browser might be easily bypassed by malware, since it only relies on file structures (in addition to magic numbers). Malicious modification (e.g., encryption) may be concealed and the user is tricked to commit it (e.g., encrypting only selected chunks of a file). A more comprehensive content verification mechanism in the trusted environment may be achieved by using analytic/machine learning techniques, at the expense of increased TCB, as well as the risk of false negatives and false positives. A simple but effective solution is to boot a separate trusted OS (e.g., a freshly downloaded OS image) to check the content (cf. RRD).

Trusted environment. As we assume ransomware to acquire the highest software privilege, write operations in the protected partition must be performed in a trusted environment, meeting the following requirements: 1) No other applications (including the OS) should be able to manipulate or even observe what is running in this environment. Additionally, this environment should be exclusive and isolated, with anything else suspended, to avoid side-channel attacks. 2) Code running in this environment must have access to I/O (disk, keyboard, video), as it is not safe to delegate operations to untrusted processes outside. 3) The integrity of this environment must be attestable, i.e., it cannot be tampered with, or any tampering would be detected, causing execution to abort.

Intel TXT/AMD SVM (see Appendix A) satisfy all three requirements. The more recent Intel SGX fails requirement 2 as it does not run privileged code for I/O access. Also, as SGX is non-exclusive unlike TXT, SGX suffers from numerous side-channel attacks, including the recent Spectre/Meltdown attacks. Potential hypervisorbased solutions (e.g., running in VMM or a dedicated VM) are susceptible to side-channel attacks, failing requirement 1; hypervisors also suffer from zero-day vulnerabilities. Therefore, our discussion hereinafter will refer to Intel TXT as our TEE.

Minimal TCB. Although a full-fledged OS in TXT (e.g., tboot with Ubuntu) can be used to perform trusted operations, it is preferable to keep a minimal trusted computing base (TCB), for both auditability (e.g., avoiding numerous complex components) and maintainability (e.g., avoiding measuring large and varying files). It is even not technically feasible, because the trusted operations occur in the midst of an active user OS execution (considering the time/effort needed to save and restore various OS states). In the best-case scenario, such switching will be time-consuming, equivalent to using two OSes "alternately" (as TXT is exclusive). Therefore, we develop our own logic as a small-footprint, native program in TXT with no external dependencies.

Hardware write-protection with API. We need to expose write access to the protected partition only inside the trusted environment. The write-protection has to be hardware-enforced, as rootkit ransomware is able to manipulate any program running in the system.

Some off-the-shelf secure USB drives offer write-protection. However, it is either in the form of a hardware switch/button to be pressed by the user, or a key pad on the USB device itself, where a password can be typed. There is no way for the trusted environment to interact with the write-protection mechanism programmatically.

An ideal construction would be that the hardware write-protection can be enabled/disabled programmatically but with a secret/password. This way, by making that secret only available in TXT, we can limit the exposure of the write access within TXT as well. The self-encrypting drive (SED) satisfies this requirement. Also, to our knowledge, SED is the only technology that supports fine-grained protection ranges with separate read/write permissions, which is important as we always allow read access, and deny write access from the user OS. Fine protection granularity also allows the protected partition to coexist with the unprotected OS and other files in the same drive, instead of requiring a dedicated disk. The legacy ATA Security password can also be considered hardware-enforced write-protection (without media encryption). However, it is a non solution for Inuksuk, because only one-way locked-to-unlocked transition is allowed (SEC4:SEC5), i.e., relocking requires hardware reset, whereas Inuksuk needs the ability to switch back and forth. No support for co-location of unprotected/protected partitions is another disadvantage.

Separation of the protected partition from the original. Technically, we can write file updates immediately in the protected partition. However, unsolicited/frequent write attempts, such as updates from the automatic save feature in text editors (i.e., not initiated by the user clicking on the "Save" button), will create too many versions in the protected partition and make the system unusable due to frequent back and forth between regular and trusted environments; note that, TXT is exclusive, and writing file updates may also take noticeable time. Therefore, we leave user-selected files for protection where they are, and make a copy into the protected partition on SED. All subsequent updates happen to the original files without write-protection. The user can then decide when to commit changes to the protected partition (no versioning in the original partition), manually, or automatically at certain intervals (e.g., every 8-12 hours).

File-system in TXT. For protected write operations, we cannot simply pass the raw sector information (sector number, offset, number of bytes and the buffer) to TXT as we perform file-based operations, and the user also must select files (not sectors) for deletion. Therefore, the TXT program must be equipped with a file system.

Data mobility. The SED can also contain an unprotected partition where the OS resides, because of the fine granularity of protection ranges, while sometimes users may treat it as a stand-alone data drive. In either case, when data recovery is needed (e.g., the user OS is corrupted or compromised), the user can simply reboot from different media on the same machine or mount the SED on a different machine. The data will be readily accessible as read-only, hence aiding data mobility, thanks to the separation of read and write accesses. In case the user needs to update the files, a rescue USB, where all intact Inuksuk binaries are stored as well as a portable OS can be used to boot the same computer (where Inuksuk was provisioned). After booting with the rescue drive, the user can invoke the same updater in TXT for deprovisioning (to remove write-protection) or regular file access.

System Components and Workflow

Trusted updater. This is the core component of Inuksuk, and runs inside TXT. It is responsible for copying files from the original partition to the protected partition (in SED write access mode) as new versions, file listing (in a mini file browser), and showing file meta data to the user.

TPM. In conjunction with TXT, TPM makes sure that the secret (the SED password) is securely stored in its NVRAM storage, and can be unsealed only if the unmodified trusted updater is executed (as measured in TPM's platform configuration registers).

Secure drive. An SED drive hosts the protected partition. Without the high-entropy key/password, its protection (i.e., write protection in our case) cannot be bypassed. Note that even with physical access to the drive, reinitializing the drive with the PSID (physical secure ID) printed on it will have all data lost.

OS drivers. A few OS-dependent modules are needed to bridge the user, OS and the trusted updater, such as preparing the TXT environment. These modules do not have to be trusted after initial deployment, as the worst case is a DoS attack; see also Section 6, item (a).

Workflow. The generalized workflow of Inuksuk is as follows: (a) At deployment time, a high-entropy secret is generated as the SED password and sealed into TPM (can only be unsealed in the genuine trusted updater). (b) The protected partition is created with the write-protection of SED. The user also selects the folders to be protected, which are then copied to the protected partition in the first invocation of the trusted updater. After the first-time copying, the user still interacts directly with her files in the original partition. (c) In everyday use, the protected partition is never touched (except for read-only access). As with certain cloud storage services, we use an icon on the original files to indicate which ones are under the protection of Inuksuk. (d) If the user adds or updates files in the original partition and ready to commit her changes, she triggers the trusted updater, and without involving her to verify, changes are committed as new files/versions on the protected partition.

The updater is triggered either manually, or automatically, e.g., via scheduled tasks, when the updating-application is closed, or when the system is restarting or shutting down. (e) When the user wants to delete files or old file-versions, she can manually trigger the updater to open a mini file browser, and make the selections (she should be shown necessary file information).

A Remote Data Vault

The functionality of Inuksuk does not rely on any third parties (except the device manufacturer), as the trust is anchored in hardware and all its components are local. Although we primarily present Inuksuk as a stand-alone solution, there is no fundamental barrier in the design for it to be deployed as a remote/networked data vault. To provide users with a centralized option, as well as extending for enterprise and cloud storage services, we briefly explore a variant of Inuksuk (only the high-level design) where the key components, i.e., TXT CPU, TPM and SED, are shifted to a network location, forming a remote service. Users' data will remain protected at a central, Inuksuk-backed storage service, and users can keep using any device of their choice (i.e., with or without TEE, mobile or desktop). We believe that this variant can be used to protect security-sensitive/user files stored in cloud storage services like Dropbox and OneDrive, or enterprise storage services. Although such services are possibly backed by robust backup measures and strict security policies/tools, if infected, consequences can be high. The construction goes as follows: any desktop/laptop/mobile device serves as the front-end directly used by the user. Through an account, the front-end is connected to a storage back-end, which plays the role of the "original partition" in our stand-alone setup, caching file updates. Eventually, an Inuksuk-equipped backup server, which has the TXT-capable CPU and chipset, as well as the SED (or more likely, an SED array), is connected with the storage backend. The Inuksuk-server will periodically copy new/updated files from the storage server, and become unavailable during this period, which should not affect functionality, assuming the Inuksuk-server is not used for other purposes. The storage back-end and user devices remain available all the time.

Note that, in addition to introducing a new trusted party (an enterprise), we do not bloat the Inuksuk TCB, except that the Inuksuk updater must now handle networking (from within TXT) to connect with the storage back-end. Once deployed correctly, without the high-entropy key sealed in TPM, no remote attacker can turn off the write-protection and update/delete the protected files. Our threat model now assumes that the remote attacker can infect the storage and Inuksuk servers, in addition to user devices. As before, only the uncommitted files remain vulnerable, and after written to the Inuksuk protected storage, user files become safe against any data modification attacks. Content on the Inuksuk-equipped server can be maintained by enterprise IT administrators (e.g., deleting old versions). The whole process is transparent to end-users/employees, and the files that need ransomware protection can be identified by enterprise policies.

Implementation

We implement Inuksuk for both Windows and Linux using existing techniques/tools discussed below. Implementation issues regarding CPU/disk performance are discussed further herein.

Since Inuksuk's secure file operations occur alongside the user OS, a mechanism is required for jumping back and forth between the trusted updater and the user OS. It can be implemented as a device driver (in the user OS) dealing with parameters, saving the current OS state, processing TXT logic, and restoring the saved OS state when returned from the trusted updater. Several such operations are already handled in Flicker, which we use as the base of our prototype. We discuss performance issues related to Flicker OPAL Access to SED Inside TXT All software outside TXT, including the user OS and all its device drivers, is untrusted in Inuksuk. However, inside the TXT environment, there is no run-time device support, i.e., devices including any SED drive cannot be accessed by default. Therefore, we must implement standalone (and preferably lightweight, to limit the TCB) custom driver for accessing SED devices inside TXT. Various SED protocols rely eventually on the SATA interface (ATA Command Set), with two options to choose: 1) ATA Security password: most SEDs support a user password for compatibility with regular mechanical drives, usually prompted in the BIOS before OS. The entire drive is in a binary state of either unlocked (fully accessible) or locked (fully inaccessible). In this option, SEDs only differ with regular hard drives in that user data is always stored encrypted on the media. 2) The use of dedicated security protocols: such protocols include Seagate DriveTrust, IEEE 1667 and Microsoft eDrive (all based on TCG OPAL/OPAL2).

They implement support for multiple roles/users corresponding to multiple ranges, with separate passwords for write/read access. They use ATA Trusted Computing features (command TRUSTED SEND/RECEIVE) to transfer protocol payloads. Granularity in both protection ranges, and separate read/write permissions is important in our design. The same drive can host both protected and unprotected partitions (which cannot be achieved in Option 1). Thus Option 2 is more suited for our needs, and we choose to use TCG OPAL to communicate with SED, as it is an open standard and widely supported by most devices. There are a few open-sourced tools that can manipulate SED devices with OS support (in addition to proprietary tools for vendor specific protocols); we have tested msed [45] (now merged into DTA sedutil) and topaz-alpha. They mainly rely on the I/O support from the OS, e.g., SCSI Generic I/O, in the ATA passthrough mode. However, our TXT piece of application logic (PAL, the payload in Flicker) is OS-less with no run-time support. We decide to port functions from topaz-alpha [3] as needed. The porting process faces several engineering challenges, see Appendix B. More details about the OPAL protocol can be found in the TCG specification [59]. Overall, OPAL communication involves level0/1 discovery (protocol handshake to agree on version and parameters), logging into a session using the corresponding password, and manipulating the tables in SED to set permissions (locking/unlocking).

Secure User Interface

For file selection, we must provide UI for the user to interact within the trusted environment; note that, during this time, the entire user OS remains suspended. Providing secure UI is critical as the user may make wrong selection based on false information (if the TXT-to-user channel is compromised), or simply the user selection is forged (if the user-to-TXT channel is compromised), leading to arbitrary data of the adversary's choice deleted from the protected partition. As we assume hardware is always trusted (see Section 2), we discuss only the software part of these UI channels. We consider the following options for using the frozen display (from the user OS):

(1) Switching back to 16-bit real mode and resuming 32-bit protected mode after calling Video BIOS for display. This simple approach is ideal for small footprint and for infrequent switching. However, Intel TXT works only with protected mode, making this approach infeasible.

(2) Using the Virtual 8086 (v86) mode to invoke Video BIOS. The v86 mode is supported by the CPU (providing separate TSS for tasks) but the software developer must write a v86 monitor (like a VMM) and corresponding components handling interrupts, I/O, and so on. We exclude this considering its complexity and compatibility issues.

(3) Developing a custom (preferably, universal) display driver for the TXT session. This involves porting only I/O operations, and does not have the two drawbacks above. But it would be inevitably vendor-specific, as before entering TXT, the OS has already set the video card in a state unknown to us (we tried a few sequences but could not reset it to the legacy VGA mode). It may be technically possible on certain models but not guaranteed to work.

(4) With the aforementioned three options ruled out, we propose to use a different but effective method. We ask the entity that knows well the video card (which is Windows in our case) to reset it to the legacy VGA mode, without trusting it (other than the possibility of a DoS attack), and then use our own logic inside TXT to take it over and display the content. This approach preserves both compatibility and compactness.

To realize Option 4, we resort to a set of (less-used) Windows kernel APIs, e.g., the x86 BIOS emulator, and develop an OS driver. These APIs use the v86 mode (as in Option 2) to call BIOS functions. We modify the Flicker Windows driver for loading PAL, so that right before entering TXT, the display is reset to legacy VGA using x86BiosCall( ) and after exiting TXT, we restore it to the previous high resolution via the same function. This way, inside TXT we can manipulate the display as if the system is just freshly booted. In our Linux prototype, we use vbetool and mode3 that can make use of the Video BIOS to set VBE modes similar to Windows. We use a custom sequence of commands to resume display (details omitted for brevity).

DMA in TXT. Currently, USB keyboards are the norm, but they are non-trivial to support within TXT. Unlike other simpler protocols, the controller (e.g., EHCI) requires several host-allocated buffers in the main memory (DMA chunks) for basic communication with the host (e.g., the periodic frame list). The controller accesses the buffers without the CPU's intervention, hence, Direct Memory Access. However, the fundamental protection of TXT (like all other trusted execution environments) must prevent autonomous access from peripherals. The MLE memory is included in either the DMA Protected Range (DPR) or Protected Memory Regions (PMRs), which is mandatory.

Consequently, since we cannot (and do not want to) exclude the MLE from DMA protection, we have to allocate the USB DMA chunks outside. We do not consider possible security implications of exposing DMA regions outside the MLE in general; however, in our specific case where physical attacks are excluded and no other code is running in parallel, doing so does not pose a threat. We also support PS/2 keyboard. In Flicker, the PAL program is assigned Ring 3 with confined memory access only to the MLE (TXT-measured region), justified for security reasons. The base address in its GDT descriptor is set to the start of the MLE region and addressing in it will be offset by the MLE start. To preserve this design, we adapt all MMIO access functions (such as reading/writing EHCC registers) with in-line assembly to temporarily switch the data segment (DS) to a global one, covering the whole address space. With the small tweak, USB with DMA can work transparently in Inuksuk.

Performance Considerations

In this section, we discuss certain performance issues for Inuksuk; our solution techniques can also be useful for other OS-less I/O intensive TXT applications. We perform our development and evaluation on an Intel Core i7-2600 @3.40 GHz, 16 GB RAM (3 GB is usable in 32-bit mode), and Seagate ST500LT025 SED disk. We implement Inuksuk for both Windows 7 and Linux/Ubuntu 12.04.

File System Efficiency

As discussed hereinabove, we choose to handle updates to the protected partition at file-level instead of raw sectors. This requires at least basic file system functionalities implemented within TXT. As a first step, we explore several open-source FAT32 projects for easy portability to TXT, instead of implementing the entire specification on our own. We exclude FAT32 projects that are tightly coupled with external dependencies, e.g., the FAT driver in Linux interfaces with inodes (Linux VFS). FAT32 implementations targeting embedded systems are more fitting for our purpose, but several other factors must be considered. For instance, ThinFAT32 appeared to be a good fit, as it is lightweight, written purely in C, and requires no dynamic memory allocation; nevertheless, it lacks support for the deletion flag 0xE5 (i.e., deleted entries are not recognized, which we patch easily), and more critically, buffering (resulting low performance). Important features that we need in a lightweight FAT32 implementation, include: (1) Buffering support. Usually, FAT32 access is sector-wise, and most block devices are also accessed in sectors. However, an I/O request can involve multiple sectors (specifying start sector and number of sectors to read/write), offloading I/O processing from CPU to the DMA controller. For PIO modes, it does not make much difference to send one bulk request vs. many one sector requests, as the CPU handles all sectors one by one. It is essential for DMA (see Section 5.3) to handle a certain number of sectors for performance. If only one sector is requested, the overhead will be significantly high, and thus no performance is gained with DMA (as in the case of ThinFAT32). Usually the FAT32 implementation exposes the low-level read/write interface to the developer, and if it does not support buffering, the read/write functions we implemented will always receive one sector to read/write. Note that hardcoded pre-fetching for reads is an overkill (reading data never needed), and hardcoded write buffer will hang (waiting for enough number of sectors).

(2) Multi-cluster support for space allocation. At the file creation time, and when a file grows in size, FAT32 must traverse all clusters to find free clusters to be appended to the cluster chain of the file. Interestingly, with all FAT32 projects targeted for embedded systems that we tested, only one cluster is allowed to be added (we do not see any performance problem for allowing multiple). Therefore, for a 50 MB file taking 6400 clusters (8 KB cluster-size) and the partition having 131072 free clusters (1 GB), it takes more than 800 million iterations. In the end, with DMA enabled but no support for multi-cluster allocation, the time needed for file creation is about 80 times slower than overwriting an existing file requires no searching).

Our solution. We tested several libraries, including fat_io_lib, ThinFAT32, fedit, efsl, etc. None of them support both features; e.g., fat_io_lib has buffering but no support for multi-cluster allocation, and efsl supports multiple clusters but is deeply rooted in single-sector disk read/write. We choose fat_io_lib for adaptation, because of its good buffering performance. For each iteration, we start with the cluster where we left off, instead of the first cluster of the partition. We emphasize that Inuksuk is not dependent on any specific file system, and thus FAT32 can be replaced with a more efficient one.

CPU Slowdown in Flicker PAL

Our initial prototype was slow: it took more than 23 minutes just to copy a 50 MB file. This first led us to doubt the performance of the FAT32 library we used. However, when tested with only a 1-million-iteration loop with NOPs (i.e., no operations), we found it to be about 500 times slower within Flicker, compared to Ubuntu/Windows. By putting this loop in different places in both the Windows Flicker driver and the PAL, we finally found that the slowdown starts right after the Flicker driver updates the Memory Type Range Registers (MTRRs) in preparation for the PAL. MTRRs control the caching properties of the specified RAM regions, i.e., whether caching is allowed for a memory range and how specifically, e.g., uncachable or writeback/writethrough.

The SINIT module for TXT mandates that there is a dedicated MTRR entry for it (WB for writeback), and the rest of the memory must be set to one of the supported memory types returned from GETSEC[PARAMETERS]; otherwise, TXT will crash.

Flicker first saves all MTRRs for Windows, creates the SINIT only entry overwriting the MTRRs, and after the PAL execution finishes, Flicker restores the Windows MTRRs. This sequence is similar to Intel tboot, i.e., tboot saves the boot-time default MTRRs before it runs the TXT MLE, and restores MTRRs before loading the OS (e.g., Ubuntu) so that the OS still sees the boot-time MTRR state; in between within the MLE, policy enforcement is executed, which is not CPU-intensive. In Flicker, its PAL replaces the tboot MLE, and the MTRR values saved/restored are those of Windows. It is not possible to restore the values earlier (before resuming Windows) although the actual payload resides in the PAL. We suspect that at the time Flicker was designed, caching may have not played a major role in the processor's performance for the tasks tested, and thus the slowdown was not as noticeable as ours now (more than 500 times). We verified this behavior by contacting a Flicker author.

Our solution. The first attempt was to keep the same MTRR save/restore sequence, and explore the supported memory types in parallel with SINIT. However, on our test machine, the returned memory type flags corresponded to UC (uncacheable) and WC (writecombining); WC is still extremely slow (as per the 1-million-iteration loop: WB=0.57 ms vs. WC=295.61 ms). Even if other machines support better types, it will still be machine-specific. Since the restriction on supported memory types is relaxed after SINIT execution (but still before the PAL starts in MLE), we define a second MTRR entry with WB after the SINIT one, to cover the region of the PAL, where our trusted updater resides. Thereafter, the performance is restored, i.e., the execution of the NOP loop takes almost the same time as in Ubuntu (or even faster, because of no multitasking).

Adding Support for DMA Disk Access

After addressing the CPU slowdown issue in Flicker, we have a throughput at roughly 0.5-1 MB/s, as we perform disk data transfer through regular port I/O (i.e., without DMA). This speed is expected according to the theoretical speed of ATA PIO modes (also with the overhead of FAT32 logic). However, this is unacceptable from the user-experience perspective, e.g., taking 3-4 minutes to write a 100 MB file.

To improve disk access performance, we implement ATA DMA access support inside the PAL. The effort is mainly twofold: (1) setting up the Physical Region Descriptor Table (PRDT) so that the ATA DMA controller knows where to place/retrieve data blocks; and (2) issuing the DMA-version of the SEND (25 h) and RECEIVE (35 h) ATA commands, and especially accommodating them to the lightweight FAT32 library source code. Usually, DMA relies on interrupts, i.e., when the transfer is done, the interrupt handler will be notified to proceed to the next request (e.g., to maximize CPU time utilization in a multitasking environment). In our case, Flicker is not supposed to work with an interrupt-enabled workload (technically possible with some complex adaptation), and we merely need the performance boost through DMA, i.e., no multi-tasking and thus, requiring no interrupt support. In the end, with DMA enabled, we made file transfer in our trusted updater 50-100 times faster than using just PIO (see Section 5.4). Again, pertaining to the discussion in Section 4.3 (DMA in trusted environments), we also need to allocate the PRD tables (DMA regions) outside the MLE (no measurement or I/O protection) for the ATA DMA controller to be able to access them. For the same reason, there is no risk in doing so within our threat model.

Usage Scenarios and Performance

In this section, we discuss several human factors considered for usability in the design of Inuksuk, and our approach to keep the user experience at an acceptable level in different usage scenarios. Then, we provide performance statistics of the implemented prototype.

Disrupting regular usage. In a regular usage scenario, we have a major source of disruption: the unavailability of the computer for regular tasks. Depending on the file size (and number), for some time the user cannot use her computer during file copying (from original to protected partition), since the TXT session is exclusive.

We consider the following file operations, and explain how they are affected by Inuksuk from a usability perspective.

Adding new files. New files can be added by a user or ransomware. However, maliciously creating new files poses merely a DoS attack on storage. Thus, no user consent is needed for new files; they are simply copied to the protected partition when Inuksuk is triggered by the user or after a certain interval (e.g., once every 8-12 hours). Similar to Windows Updates, the user can define her idle/busy hours so that the trusted updater can execute during idle hours.

Updating existing files. With versioning, each update is treated as adding a new file, and requires no user consent. Note that the frequency of triggering the trusted updater must be set with care: it affects both system unavailability, and the number of versions saved for existing files. We group several save events (auto/user triggered) from applications in the original partition to reduce switching back and forth from TXT; see also Sections 3.2, 3.3.

Deleting existing files. We have developed a light-weight file browser inside the trusted updater that allows the user to choose multiple files for deletion; see FIG. 2. With more engineering effort, graphical interface can also be created. There is no technical limitation of creating custom UI within TXT. Also, deletion may involve only flagging the files as deleted in the file system, and thus should be quick. Note that users can manually delete files only from our mini browser; also regular Recycle Bin functionality is preserved. Any deletion attempt from the user OS will fail (read-only access to the protected partition), or be ignored, if edited files are removed from the original partition (the updater only copies existing files from the original to the protected partition).

Older versions of an existing file can also be scheduled for auto deletion (e.g., after a year). For regular home use with a decent disk size (e.g., 2 TB), we believe users may need to manually delete files only very infrequently.

Performance evaluation. The file transfer speed determines the unavailability of the user computer, and affects user experience. However, we argue that the way we implemented DMA and our choice of the FAT32 library (as well as our adaptation to it) are confined by the engineering effort and time. Therefore, the numbers we show here should be just the lower bounds. We executed 10 measurements on the files we selected with typical sizes; see Table 1.50 MB represents common media files (the same order of magnitude) and 500 KB represents miscellaneous files of trivial sizes. Note that without our adaptation to enable multi-cluster allocation support, the creation of a 50 MB file can be done only between 0.5-1 MB/s, while overwriting of an existing file of the same size runs at about 40 MB/s. To demonstrate Inuksuk's performance in a realistic usage scenario, we invoke the trusted updater to copy 50 random photos (JPG files, size ranging from 1009 KB to 2416 KB, totaling 85.6 MB) from the original partition to the protected partition. We measured the duration for 10 times, and the performance seems reasonable (mean: 23.3853 seconds), and relatively stable (standard deviation: 0.58989). This is a combination of read, write, file opening/closing, accumulating space fragments, etc. We also evaluated only the transition time between the OS and trusted updater. It varies between 2-4 seconds, including screen mode switching.

If we take into account any extra processing during file transfer, the time needed may also be affected. The basic versioning Inuksuk uses is not incremental, i.e., the whole of the source file in the original partition is copied over to the protected partition as a new version. We may consider some open-source version control systems like SVN/Git (or even the simple diff command) for incremental versions to save disk space. However, in that case, each time new files/ updates are committed, the updater must scan the whole of both files for differences and then perform the transfer. Moreover, deletion is supposed to be very quick with non-incremental versioning (just flagging the file); with diff-like versioning, for each file the updater has to reassemble from all previous versions to form the latest one to be kept. The overhead could be significant in our setting (considering batch-deletion of versions). Also, for common file types such as images, videos, and rich documents (e.g., PDF, Word), incremental versioning may not save much disk space.

Security Analysis

Since we shift the defense from detection/prevention to data immunization, we avoid common attacks such as whether new ransomware can evade detection, whether it does privilege escalation, how the encryption keys are generated and so on. There are two basic questions in evaluating Inuksuk's effectiveness: 1) Outside the trusted environment, can ransomware update files on the protected partition? No, without the high-entropy key sealed in TPM, software on the host system cannot break the write-protection enforced by SED. 2) Inside the trusted environment (updater), can the ransomware trick the user or the updater to write arbitrary content of his choice? The updater does not synchronize any file deletion from the original partition but only adds files from it. With the updater's integrity ensured by TXT, user I/O cannot be influenced by any external software.

(a) Malicious Termination, Modification or Removal of Inuksuk

A simple but effective attack against Inuksuk is terminating its kernel driver in the OS, or even completely removing it. Similar to rootkit malware's termination of host-based anti-malware defenses, rootkit ransomware can easily launch this attack against Inuksuk. The pre-existing files in the protected partition remain immune to this attack; however, newly created or updated files thereafter are not protected. However, unlike anti-malware defenses, which run mostly transparent to users, users are expected to interact with Inuksuk, albeit infrequently (e.g., manually triggering Inuksuk for committing new/updated files, and file deletion), and thus may notice when Inuksuk cannot be launched. When the ransomware's presence is apparent, users can take other mitigating actions, e.g., reinstallation of OS/software, updating OS/anti-malware signatures. Note that modifying the Inuksuk updater's binary, which may reside in the unprotected partition, does not help the attacker; the SED unlock secret can only be accessed by the genuine Inuksuk updater (TPM unsealing).

(b) Known Attacks Against SEDs

SEDs are also vulnerable to known attacks against software FDEs (e.g., cold boot, warm boot, DMA, and evail-maid). They also found a simple attack called hot plug, enabled by the fact that SEDs are always in a binary state of locked or unlocked. Once it becomes unlocked in a legitimate manner (e.g., user-supplied unlock passwords), the adversary can connect the disk to another attacker-controlled machine without cutting power, and can get access to protected data. In addition to these attacks, an adversary may also capture the cleartext SED secret/password from the SATA interface, e.g., by tapping the connection pins with a logic analyzers. Since all such attacks require physical access, they are not viable for a scalable ransomware attack. However, if a software-only attack can bypass SED protection (e.g., unlock a partition without supplying the corresponding secret), Inuksuk will be defeated. No such attacks exist thus far.

(c) Attacks on TXT/TPM

Although TPMs offer some physical tamper-resistance, TPMs and similar security chips have been successfully attacked in the. However, with physical access excluded, we do not need to consider these attacks; also note that tapping TPM pins and DMA attacks require a malicious device to be connected. Regarding known software-only attacks against TXT, most such attacks are ad-hoc (e.g., the SINIT module flaw), or version specific; Intel has purportedly patched them in the subsequent versions, or at least the user is motivated to choose one that has no known flaws.

There are also attacks against TXT that exploit the System Management Mode (SMM), an intrinsic part of the Intel x86 architecture, referred to as Ring-2. Normally if we assume anytime before entering TXT, the system (including BIOS) is compromised, and SMI (SMM interrupt) is left enabled when entering MLE, a malicious SMI handler can always preempt the TXT execution and intercept any trusted operations. However, there must be certain code triggering SMI (manipulating physical SMI # pin is out of scope), e.g., writing to port 0x62. This could be from an OS, hypervisor or bootloader loaded in TXT, which must have SMI enabled but has compromised/vulnerable code. In the case of Inuksuk, neither of the two factors satisfy: 1) SMI is not needed in our custom code—the trusted updater. So we just do not trigger it. Because of TXT's exclusiveness, no other code can trigger it either.

2) We can also disable SMI upon entry, leaving no time for any triggering. Another possible (powerful) attack avenue similar to SMM is vulnerable Intel Management Engine firmware. Unless there is a pressing need for ME, we suggest to disable it in a rigorous manner.

(d) Delayed Attacks after Deletion

Persistent ransomware can stay hidden for a long period (ranging from weeks to months), during which it just transparently decrypts encrypted data when accessed. This can trick the user to believe that her data is intact (when viewed from within the OS). At some point, if she removes older versions to save space, then the ransom can be demanded (i.e., no more showing the decrypted version).

The root cause of this problem is that OS-based file viewers (e.g., Microsoft Word), run outside the trusted environment and can be manipulated by rootkit ransomware arbitrarily, such as performing decryption before displaying a file to the user, or simply feeding a cached, unencrypted copy of the file. A straightforward countermeasure is to perform verification inside the updater before removing previous versions, e.g., by porting advanced file viewing tools in TXT, which can require significant effort. A simpler approach is to use (imperfect) encryption detectors and other ad-hoc mechanisms Another possible way would be to boot from a trusted OS image (e.g., USB) to check files before deletion (inefficient, but needed only occasionally). If auto-deletion of old versions is enabled, we suggest the duration should be long, e.g., a year or two, depending on the size of the protected partition. Note that, delayed attacks risk being discovered and mitigated by anti-malware vendors, and thus we do not consider them a serious threat.

(e) Hiding/Locking Access to Files

Inuksuk defends against ransomware based on data inaccessibility (e.g., erase or encryption). However, another variant of ransomware, which is more prevalent in mobile platforms, is locking-based (non-crypto). It simply blocks the user's access to computer resources, e.g., by switch ng to a blank desktop using CreateDesktop( ) or by showing a persistent HTML page. Since it mainly targets non-computer-savvy users, simply showing a screen PIN lock on the mobile phone may lock the user out and suffice for demanding ransom. This can also be done on top of encryption, to make locating files non-trivial (e.g., overwriting the master boot record). Such ransomware, although still worrisome for non-computer-savvy users, is relatively easier to cope with. With proper tools, recovering data is highly possible (e.g., by reverting the system changes), as the original data is preserved.

(f) Forged User Interface

Due to human users' inability to authenticate machines, a common means of attack by rootkit malware is to mimic the appearance of the intended program/tool, where the user can be tricked to leak secrets. However, the adversary will not benefit from it, as there is no UI in Inuksuk for prompting for the SED unlock secret (in fact, the unlock secret is unknown to users). Also, for manual deletion, there is no way to specify which files to delete from outside the trusted updater (files are selected in TXT right before they are deleted). In the end, without the genuine updater in TXT, the adversary cannot manipulate any file in the protected partition.

(g) Attacking Auto-Deletion

If auto-deletion is enabled, i.e., older file versions are automatically deleted after a preset threshold (e.g., 365 days), a straightforward threat is clock source manipulation. Rootkit ransomware can adjust the system time (to a far future date) to fool Inuksuk to believe the versions are already too old to be kept. To address this, Inuksuk can be configured to only trust a signed NTP time from a remote server, absence of which will stop auto-deletion (see Section 3.2).

APPENDIX

Trusted Execution Environment (TEE). Modern CPUs usually support a special secure mode of execution, which ensures that only pre-configured unaltered code can be executed, with integrity, secrecy and attestability; and provides a form of isolation from both other software/firmware and physical tampering. TEE can be exclusive, preempting and suspending other code (as in Intel TXT), or concurrent, co-existing with other processes (as in Intel SGX and ARM TrustZone).

Technically, TEEs cannot function alone. For the purpose of storing measurements (to be matched with that of the code being loaded) and secure storage of execution secrets, a secure element is used in conjunction. It can be part of the processor die, an integrated chip, or a discrete module.

Intel TXT. Trust Execution Technology is Intel's first "late launch" technique, aiming at establishing trusted execution any time after system recycle, without relying on what has been already loaded (e.g., BIOS). It is exclusive, removing software side-channel attack vectors and with the help of VT-d, largely defending against violations from the I/O space. TXT works with TPM (Trust Platform Module) as the secure element.

Sealing. Short for cryptographic sealing, it is a special mode of encryption, provided by TEEs, where the key is derived (in many ways) largely from the machine state, in the form of measurement.

Measurement is the chaining of the loaded programs in sequence, e.g., concatenation of hashed values. Any single bit of change in loaded programs will cause a mismatch of measurement, making the derived key different, and thus render the decryption (unsealing) to fail. In this way, platform binding is achieved.

Flicker. Before the advent of Flicker, Intel TXT was mostly applied with the pilot project tboot, which deals with boot-time trusted execution. The ability to switch between the regular OS environment and the trusted execution had always been desired.

Flicker enables such transitions, e.g., interrupting and saving states for the OS, initiating the TXT session, performing trusted operations and resuming the OS. The trusted operations are encapsulated in what is called a PAL (piece of application logic) and thus OS agnostic. It satisfies what is needed in Inuksuk.

Self-Encrypting Drive. With the same interface and form factor, regular hard drives or SSDs can be equipped with a built-in crypto engine and certain enhancement to the controller, thus providing on-device encryption and access control. Such devices are called Self-Encrypting Drives (SEDs). Most SEDs offer fine-grained protection, such as dividing media space into ranges and splitting read/write accesses.

The several design flaws or firmware bugs identified by researchers mostly rely on physical access, i.e., desoldering a microchip, manipulating the connector or evil maid attacks. Inuksuk is not affected by such attacks, as only software adversaries are considered. Also what we need is merely the write-protection While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A system for protecting a set of at least one user-editable file against unauthorized data alteration, including deletion or overwrite in part or full, or other data alterations, or data unavailability, including making the file unavailable to the user, or making the file updatable to any unauthorized benign or malicious processes, or other data unavailability, or both data alteration and data unavailability, the system comprising:
   at least one untrusted operating environment, making available at least one user-editable file for creation and editing, including reading, writing, and deleting, the user-editable file or files being stored in at least one non-protected partition of at least one storage drive; and
   a trusted operating environment, generating and providing an authentication key without any user involvement to access at least one protected partition of at least one storage drive, and sending instructions to create or to delete or to create and delete copies of the at least one user-editable file in at least one protected partition of at least one storage drive; and
   at least one protected partition of at least one storage drive, characterized by:
      protection of the at least one partition provided by the corresponding at least one storage drive;
      storing copies of said at least one user-editable file, each new stored copy of a given user-editable file in the protected partition corresponding to a new or an updated version of the given user-editable file;
      performing no overwrite of any stored copies of the at least one user-editable file;
      taking no instructions from the untrusted operating environment illegitimate or legitimate, that can cause overwrite or deletion of any stored copies of the at least one user-editable file; and
      providing read-only access to the at least one user-editable file from the untrusted operating environment without the authentication key, or providing no access, including read-only access, to the at least one user-editable file from the untrusted operating environment.

2. The system according to claim 1, wherein the at least one user-editable file comprises a set of to be protected files and folders initially selected in an uncompromised untrusted operating environment to be stored as copies in at least one protected partition of at least one storage drive, and the initially selected set of files and folders are accessible in untrusted operating environment as left unaffected in the at least one non-protected partition, or as given read-only access from the untrusted operating environment to the at least one user-editable file in the at least one protected partition of at least one storage drive without the authentication key.

3. The system according to claim 1, wherein the trusted environment providing more than one authentication key to unlock one or more protected partitions of one or more storage drives, and the more than one authentication key are never disclosed outside the trusted environment but used directly therein to unlock the at least one protected partition of at least one storage drive.

4. The system according to claim 1, wherein a trusted updater module running inside the trusted operating environment performs the creation of new versions of the at least one user-editable file in at least one protected partition, leaving the given user-editable file unaffected in the at least one non-protected partition, and later updates and deletions can only be performed by the trusted updater module running inside the trusted operating environment.

5. The system according to claim 1, wherein the trusted operating environment is triggered from attesting presence of hardware-enforced operating conditions, the trusted operating environment being capable of performing privileged operations such as access to use the at least one protected partition of at least one storage drive without relying on the untrusted operating environment or the user.

6. The system according to claim 1, wherein one or more untrusted operating environment running on the same machine as the trusted environment are suspended prior to triggering the trusted environment, eliminating chances of information leaks that expose the authentication key.

7. The system of claim 6, wherein suspending at least one untrusted operating environment comprises at least one or more of suspending a currently running operating system, saving all execution states of the at least one untrusted operating environment for restoration later, and resetting the environment to a clean state in preparation for the trusted environment, or any combination thereof.

8. The system of claim 6, wherein at least one untrusted operating environment is suspended and the triggering of the trusted operating environment is carried out at a point in time after or immediately after a most recent boot sequence of at least one operating system.

9. The system according to claim 1, wherein scheduled tasks in the untrusted operating environment invoke the trusted updater module running inside the trusted operating environment to store new copies of said at least one user-editable file in the at least one protected partition of at least one storage drive when the updating application running in the untrusted operating environment is closed, or when at least one system in the untrusted operating environment is starting up or shutting down, or in a predetermined interval.

10. The system according to claim 1, further comprising at least one file browser in the trusted operating environment that provides delete instructions triggered by the trusted updater regarding which versions of the copies of the user-editable file to be deleted and in response the trusted operating environment deletes corresponding copies of the user-editable file stored in the at least one protected partition.

11. The system according to claim 10, wherein the delete instructions are made manually by one or more users interacting with at least one file browser directly in the trusted operating environment, not through the untrusted operating environment, and the delete instructions are never permitted from the untrusted operating environment and are never permitted to be affected by the untrusted operating environment.

12. The system according to claim 10, wherein the copies of the user-editable file stored in the protected partition are deletable only via at least one file browser running only in the trusted operating environment, never running in the untrusted operating environment, and never taking any overwrite or deletion input or request from any process, program or system running in the untrusted operating environment, except for taking request to add new versions from the untrusted operating environment.

13. The system according to claim 1, further comprising one or more predetermined deletion rules, relieving the user of any need to manage file based or file group based attributes or other attributes, that are only accessible and editable in the trusted operating environment; and the trusted operating environment deletes copies of at least one user-editable file stored in the protected partition in accordance with these deletion rules.

14. The system according to claim 13, wherein the predetermined deletion rules stored in at least one protected partition of at least one storage drive for automatic deletion of older copies of the user-editable file relieving the user of any need to manage file based or file group based attributes or other attributes.

15. The system according to claim 13, wherein the copies of the user-editable file stored in the protected partition are deletable only in accordance with the predetermined deletion rules without requiring the user to manage file based or file group based attributes or other attributes.

16. The system according to claim 1, wherein modules in untrusted operating environment are used to bridge user input devices, one or more Operating Systems (OS) in untrusted operating environment and the trusted updater running in trusted operating environment, including providing the user with deletion, update, overwrite, and creation of the at least one user-editable file in untrusted operating environment and providing the updates done by deletion, update, overwrite, and creation to the trusted updater.

17. The system according to claim 1, wherein the authentication key is sealed into at least one of Trusted Platform Module (TPM), Secure Element (SE), or similar security enhanced hardware.

18. The system according to claim 1, wherein the trusted operating environment is implemented by at least one of a Trusted Execution Environment (TEE)-enabled Central Processor Unit (CPU), or a similar trusted environment enabled processor unit.

19. The system according to claim 1, wherein the trusted operating environment is implemented in at least one selected from the group of Intel TXT processor, or AMD SVM processor, or a similar processor.

20. The system according to claim 1, wherein one or more storage drives containing at least one protected partition are at least one of a Self Encrypted Drive (SED), or a similar security enhanced device, whereas the security enhanced device ensures inaccessibility of at least one protected partition for writes or both reads and writes without the authentication key.

21. The system according to claim 1, wherein the trusted environment implements dedicated security protocols and provides access to the at least one protected partition of at least one storage drive using the implemented dedicated security protocols, including but not limited to TCG OPAL-based protocols, providing read-only access to the at least one user-editable file from the untrusted operating environment, or providing no access, including read-only access, to the at least one user-editable file from the untrusted operating environment.

22. The system according to claim 1, wherein storage drives include one or more local front-end storages operating in at least one untrusted operating environment and one or more remote back-end storages operating as the at least one protected partition of at least one storage drive preventing any access without the authentication key, and storing the latest edited state or states of at least one user-editable file until they are committed as new copies in one or more protected partitions.

23. The system according to claim 22, wherein one or more front-end storage is at least one of any storage system, any device, or any unprotected storage, and at least one remote back-end storage is the at least one protected partition of at least one storage drive.

24. The system according to claim 1, wherein the trusted operating environment is connected to the at least one remote back-end storage containing at least one protected partition, where protection of the at least one partition is provided by the at least one remote back-end storage.

25. A computer-implemented method of protecting a set of at least one user-editable file against unauthorized data alteration, including deletion or overwrite in part or full, or other data alterations, or data unavailability, including making the file unavailable to the user, or making the file updatable to any unauthorized benign or malicious processes, or other data unavailability, or both, the method comprising:

while operating in one or more untrusted operating environments, making available one or more user-editable files for creation and editing, including reading, writing, and deleting, the user-editable file or files being stored in one or more non-protected partitions of one or more storage drives; and while operating in a trusted operating environment generating and providing an authentication key without any user involvement to access one or more protected partitions of one or more storage drives, and sending instructions to create or to delete or to create and delete copies of the at least one user-editable file in at least one protected partition of at least one storage drive; and while using at least one protected partition of at least one storage drive, storing copies of said at least one user-editable file, each new stored copy of a given user-editable file corresponding to a new or an updated version of the given user-editable file;

performing no overwrite of any stored copies of the at least one user-editable file;

taking no instructions from the untrusted operating environment, illegitimate or legitimate, that can cause overwrite or deletion of any stored copies of the at least one user-editable file;

providing read-only access to the at least one user-editable file from the untrusted operating environment without the authentication key, or providing no access, including read-only access, to the said at least one user-editable file from the untrusted operating environment.

26. A system for protecting one or more files against one or more compromised operating systems or compromised applications or combination thereof, the system comprising:

a set of operating components for selectively operating in one or more untrusted operating environments and a trusted operating environment, the components being configured to:

while operating in one or more untrusted operating environments, make available one or more user-editable file for creation and editing, including reading, writing, and deleting, the user-editable file or files being stored in one or more non-protected partitions of one or more storage drives; and while operating in the trusted operating environment, generating and providing an authentication key without any user involvement to access one or more protected partitions of one or more storage drives, and sending instructions to create or to delete or to create and delete copies of the at least one user-editable file in at least one protected partition of at least one storage drive; and storing copies of said one or more user-editable file or files in one or more protected partitions of one or more storage drives, each new stored copy of a given user-editable file in one or more protected partitions corresponding to a new or an updated version of the given user-editable file; and performing no overwrite of any stored copies of the at least one user-editable file in one or more protected partitions of one or more storage drives; and taking no instructions from the untrusted operating environment, illegitimate or legitimate, that can cause overwrite or deletion of any stored copies of the at least one user-editable file in one or more protected partitions of one or more storage drives; and providing read-only access to the at least one user-editable file in one or more protected partitions of one or more storage drives from the untrusted operating environment without the authentication key, or providing no access, including read-only access, to the at least one user-editable file in one or more protected partitions of one or more storage drives from the untrusted operating environment.

27. A system in claim 26, wherein the compromised operating system is hosting rootkit malware, or the compromised applications are malware applications, or both.

* * * * *